Figure 1:
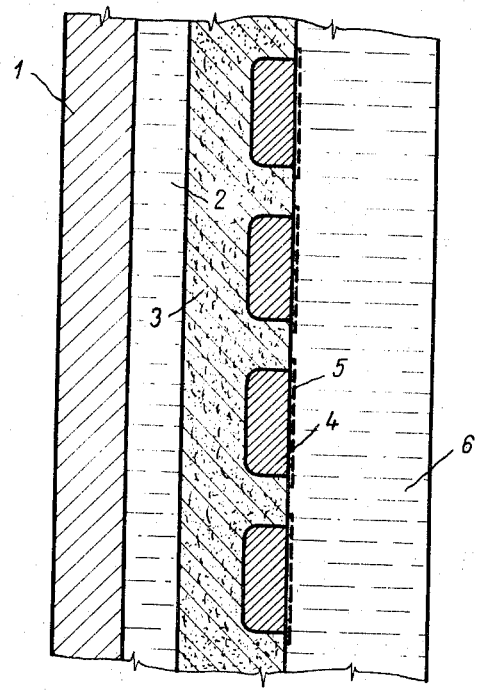

March 4, 1969

J. BALEJ ET AL  3,431,193

ELECTROLYZER FOR A SIMULTANEOUS PRODUCTION OF CHLORINE AND
ALKALINE CARBONATES

Filed May 2, 1966

INVENTORS
Jan Balej, Ivo Paseka,
BY Jiří Vondrák und
Albert Regner

Michael S. Striker
Attorney

United States Patent Office 3,431,193
Patented Mar. 4, 1969

3,431,193
ELECTROLYZER FOR A SIMULTANEOUS PRODUCTION OF CHLORINE AND ALKALINE CARBONATES
Jan Balej, Ivo Paseka, Jiří Vondrák, and Albert Regner, Prague, Czechoslovakia, assignors to Ceskoslovenska Akademie Ved, Prague, Czechoslovakia
Filed May 2, 1966, Ser. No. 546,855
Claims priority, application Czechoslovakia, Apr. 30, 1965, 2,854/65
U.S. Cl. 204—266                                8 Claims
Int. Cl. B01k 3/10

The invention relates to an electrolyzer for a simultaneous production of chlorine and alkaline carbonates with a cathode resistant to the corrosion effects of the electrolyte.

In application Ser. No. 546,855, Balej et al., assigned to the same assignee as the present application, there is disclosed an electrolyzer for the production of alkaline carbonates formed in the electrolytic production of chlorine by a diaphragm method, the device being so arranged that into its cathodic space is introduced carbon dioxide and thus directly in the electrolyzer a sodium carbonates solution is obtained (see also Czechoslovak Patent No. 114,352). The principle of the method consists in the separation of the effective area of the cathode from the diaphragm, which is being realized in two ways: either by applying an asbestos diaphragm to a supporting net of a corrosion-resisting material, possibly of a metal coated with some electric insulating and corrosion-resisting layer, or by spreading the asbestos diaphragm over a perforated sheet which on the side over which the asbestos diaphragm is spread has previously been coated with some-conducting corrosion-resisting material.

In practice it has turned out that the rather complicated design of electrolyzers of this type involves high demands on the material required for the production of the device, especially on the corrosion-resistance of the material used. Damage or removal of the protective coating in consequence of corrosion causes a failure of the function of the electrolyzer and impairs the technical-economic indices, which manifest itself as a decrease of the current yields.

The above disadvantages are obviated by the present invention. Its principle is an electrolyzer for a simultaneous production of chlorine and alkaline carbonates with a supply of carbon dioxide into the cathodic space and with a vertical filtering diaphragm; the asbestos diaphragm is mounted on a cathode of perforated sheet or metal mesh, one side of the cathode being provided with a metal coating whose hydrogen over-voltage differs by at least two hundred millivolts from that of the metal on the other side of the cathode, and the asbestos diaphragm being spread over the side of the cathode having a higher hydrogen over-voltage. The cathode, for example of steel sheet, on the side adjacent to the asbestos diaphragm is either provided with a metal coating having a hydrogen over-voltage by at least two hundred millivolts higher than that of the metal of which the cathode is made, for example with a lead coating. The cathode on the side averted from the asbestos diaphragm is covered with a coating for a metal whose over-voltage is by at least two hundred millivolts lower than that on the metal of which the cathode is made, for example with an electrolytically and/or electrophoretically deposited coating of Raney nickel.

Figure 2:
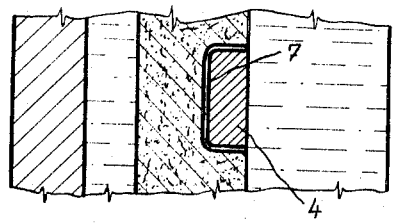

The design arrangement of the electrolyzer according to the invention is represented in the appendix where FIG. 1 shows a cathode with on the side turned off from the asbestos diaphragm is provided with a coating of a metal of a low over-voltage and FIG. 2 represents a cathode which on the side adjacent to the asbestos diaphragm is provided with a metal coating having a higher over-voltage than that of the metal of the cathode. The various parts are marked as follows: 1 anode, 2 anodic space, 3 asbestos diaphragm, 4 perforated metal sheet, 5 layer of a lower hydrogen over-voltage than that of the metal of the cathode, 6 cathodic space, and 7 layer of a higher hydrogen over-voltage than that of the metal of the cathode.

The electrolyzer according to the subject matter of the invention has a number of advantages: the active areas of the cathode in it are separated from the cathodes of the diaphragm without the necessity of the construction elements of the device being made of a non-metal material. At a practically equal electric potential and at a difference between the over-voltage on both sides of the cathode of at least of two hundred millivolts the electrode process occurs only on the active side of the cathode which is averted from the diaphragm, whereas the adjacent inactive side of the cathode does not participate in the electrode process, since the current density here is by several orders lower than on the turned-off side of the cathode. In addition to the electrolyzer according to the subject matter of the invention permits that the total voltage on the electrolyzer be lower than in the hitherto used appartaus. The electrode potential of the cathode provided with a coating of an active catalytic metal is at the given load lower than that of a normal net electrode, so that the use of the electrolyzer according to the invention results in a considerable electric power saving.

EXAMPLE 1

A cathode made of perforated steel sheet was provided on the side adjacent to the asbestos diaphragm with a lead coating applied by hot spraying. In a 6 N sodium hydroxide solution at current densities on $10^{-3}$ to $10^{-1}$ a./cm.$^2$ and at 25° C. the cathode showed an over-voltage by 700 millivolts greater than that on the steel material of the cathode. The current densities on the portions of the cathode covered with lead were by three orders lower than on the steel material of the cathode and therefore the lead coating practically had the function on an electric insulating material. In the course of the work on the electrolyzer of this type no chemical corrosion of the cathodes due to the action of the electrolyte took place because the cathode was cathodically polarized.

EXAMPLE 2

On the side of the perforated steel sheet cathode which was averted from the asbestos diaphragm was pressed a layer of powdered Raney nickel which then showed a hydrogen over-voltage by two hundred millivolts lower than that on the reverse side of the cathode. The voltage at 70° C. and at a current density of 10 a./dm.$^2$ was 3.2 to 3.3 volts, being thus by 0.2 to 0.3 volt lower than the voltage on the usual cathodes in diaphragm soda electrolyzers for the production of sodium carbonate. The electric power saving in the electrolyzer according to the invention was 5.5 to 8.5% in comparison with electrolyzers of the usual type.

What we claim is:

1. An electrolyzer for simultaneously producing chlorine and alkaline carbonates comprising an anode, a cathode, a porous electrically insulating diaphragm mounted on said cathode, a metal coating provided only on the side of said cathode facing said diaphragm, said coating having a hydrogen overvoltage by at least 200 millivolts higher than the voltage on the other side of the cathode, and means for introducing carbon dioxide into the cathode space on the side remote from said anode.

2. The electrolyzer of claim 1, wherein said coating consists of lead.

3. The electrolyzer of claim 1, wherein said metal coating of the cathode on the diaphragm side has a hydrogen overvoltage by at least 200 millivolts higher than that of the metal of which the cathode is made.

4. The electrolyzer of claim 1, wherein the diaphragm is spread over the cathode.

5. The electrolyzer of claim 1, wherein the cathode consists of a perforated steel sheet.

6. The electrolyzer of claim 1, wherein the diaphragm consists of asbestos.

7. The electrolyzer of claim 1, wherein there is provided on said cathode on the side remote from said diaphragm another metal coating having a hydrogen overvoltage by at least 200 millivolts lower than that of the metal of which the cathode is made.

8. The electrolyzer of claim 7, wherein the metal coating on the side of the cathode remote from the diaphragm consists of electrolytically or electrophoretically deposited Raney nickel.

References Cited

UNITED STATES PATENTS

| | | | |
|---|---|---|---|
| 548,162 | 10/1895 | Hargreaves et al. | 204—283 |
| 1,152,772 | 9/1915 | Wheeler | 204—283 |
| 1,862,244 | 6/1932 | Stuart | 204—283 |
| 3,057,794 | 10/1962 | Carlin | 204—252 |
| 3,242,059 | 3/1966 | Cottam et al. | 204—98 |

JOHN H. MACK, *Primary Examiner.*

D. R. JORDAN, *Assistant Examiner.*

U.S. Cl. X.R.

204—87, 128, 283